UNITED STATES PATENT OFFICE.

JOHN H. STEVENS, OF NEWARK, NEW JERSEY, ASSIGNOR TO THE CELLULOID MANUFACTURING COMPANY, OF NEW YORK, N. Y.

MANUFACTURE OF COMPOUNDS OF PYROXYLINE OR NITRO-CELLULOSE.

SPECIFICATION forming part of Letters Patent No. 269,342, dated December 19, 1882.

Application filed June 12, 1882. (No specimens.)

*To all whom it may concern:*

Be it known that I, JOHN H. STEVENS, of the city of Newark, in the county of Essex and State of New Jersey, have invented certain new and useful Improvements in the Manufacture of Compounds of Pyroxyline or Nitro-Cellulose, of which improvements the following is a specification.

Compounds of pyroxyline for use and application in the arts are made from soluble pyroxyline or nitro-cellulose, (as distinguished from those forms of nitro-cellulose which are not soluble,) and other ingredients—such as coloring-matter and inert substances—according to the purpose to which the compound is to be applied. In addition to the ingredients already mentioned, such compounds require at some stage of their manufacture a solvent or converting agent to dissolve the nitro-cellulose. Such solvents are technically classed as either volatile or non-volatile, and as active or latent. Ether and alcohol, wood-naphtha, and other menstrua are examples of volatile active solvents which are almost entirely driven off in the treatment of the compound, and camphor is an example of the non-volatile and latent solvents which are not so driven off, but remain largely in the finished product. These classes of solvents have heretofore been combined so as to modify the volatility and restrain the activity of the one and to stimulate or facilitate the development of the solvent action of the other, and heretofore the best products have been obtained by such a combination as that of wood-naphtha or alcohol and camphor, the use of which is well understood.

It is the object of my invention to manufacture compounds of pyroxyline without necessarily employing camphor, and to retain the advantages of a non-volatile solid latent solvent, such as camphor is, to which end I have ascertained by experiment that dinitro-benzine and coumarine are substances which I can employ for this purpose, and these are what I hereinafter claim as my new latent solid solvents. To two parts, by weight, of soluble pyroxyline or nitro-cellulose I add from one to two parts of dinitro-benzine or of coumarine, and, as the best practice, I reduce the nitro-cellulose to pulp at the same time that I reduce the dinitro-benzine or the coumarine to powder and mix them thoroughly in a grinding-machine, together with any coloring-matters or inert substances which are to be incorporated in the compound, as is well understood. The ingredients thus reduced are then deprived of aqueous moisture in any of the usual ways. This mixture is a merely mechanical one, and the dinitro-benzine or the coumarine does not act upon the nitro-cellulose until the compound is subjected to heat and pressure, under which the latent converting-power of the solvent is developed, as is the case when camphor is used in the same manner. With my new latent solvents, dinitro-benzine and coumarine, I subject the compound to the action of heated dies, the heat required being about 200° to 230° Fahrenheit, at which temperature the latent solvent is liquefied and its action upon the nitro-cellulose takes place, converting the ingredients into a solid compound, which can be remolded into any desired shape under the application of heat and pressure, as is well understood.

The solvents above named—to wit, dinitro-benzine and coumarine—are also like camphor, in being solid substances, which, as already stated, only become active as solvents when subjected to such high temperatures as above indicated.

It may be desirable at times to work the compounds in masticating-rolls; but such rolls must be inclosed and heated very highly, so that I prefer to obtain the necessary conditions of heat and pressure by using closed dies.

To promote the action of heat and pressure it will be found advantageous to put the mixture of nitro-cellulose and solvent in a vessel which can be tightly closed, and to this mechanical mixture add alcohol or wood-naphtha, in proportions of about, by weight, pyroxyline ten parts, solvent five parts, alcohol or wood-naphtha four to ten parts, and allow the compound to stand in the closed vessel for about twelve hours, with an occasional stirring to more thoroughly mix the ingredients, the proportion of alcohol or wood-naphtha being greater when it is proposed to masticate the compound in rolls and less when it is proposed to subject it to heat and pressure in the closed dies. With the addition of alcohol or wood-naphtha, as above described, the compound can be worked in open rolls, though closed rolls are preferable, even when alcohol or wood-naphtha is used. When alcohol is used it will be found best to not only occasionally stir the mixture in the closed vessel during the saturating period, but also to heat the vessel and its contents, so as to promote the action of the alcohol. When wood-naphtha is used, as above described, this heating of the compound in the vessel is not necessary. The product of this process can be remolded in the usual manner, and I am thus enabled to manufacture compounds of pyroxyline with the advantages of a solid latent solvent and without necessarily employing camphor, although it is to be explicitly understood that camphor may be employed in conjunction with my new latent solid solvents, if desired.

Having thus described the nature and objects of my invention, what I claim herein as new, and desire to secure by Letters Patent, is—

As an improvement in the art of manufacturing compounds of pyroxyline or nitro-cellulose, the use of the hereinbefore-specified new latent solid solvents, substantially as described.

JOHN H. STEVENS.

Witnesses:
WM. L. BRICE,
ABRAHAM MANNERS.